Aug. 9, 1932. S. L. ADELSON 1,870,321
FILTRATION PLANT CONTROL
Filed Nov. 17, 1927   3 Sheets-Sheet 1

Fig. 1

Witness:
G. Burkhardt.

Inventor:
Samuel L. Adelson,
By Cromwell, Greist & Warden
attys.

Patented Aug. 9, 1932

1,870,321

UNITED STATES PATENT OFFICE

SAMUEL L. ADELSON, OF CHICAGO, ILLINOIS, ASSIGNOR TO GENERAL ZEOLITE COMPANY, OF CHICAGO, ILLINOIS, A CORPORATION OF ILLINOIS

FILTRATION PLANT CONTROL

Application filed November 17, 1927. Serial No. 233,779.

This invention relates to filtration plant control and it has particular relation to improved means and ways for controlling and regulating the operation of filtration plants, such as used in municipal water supply systems.

Among the objects of the invention is a system for controlling and regulating the operation of such plants so as to secure best utilization of all the parts thereof in the most efficient manner while employing extremely simple and reliable equipment.

The objects of the invention will be best understood from the following description of exemplifications thereof, reference being had to the accompanying drawings, wherein.

Figure 1:
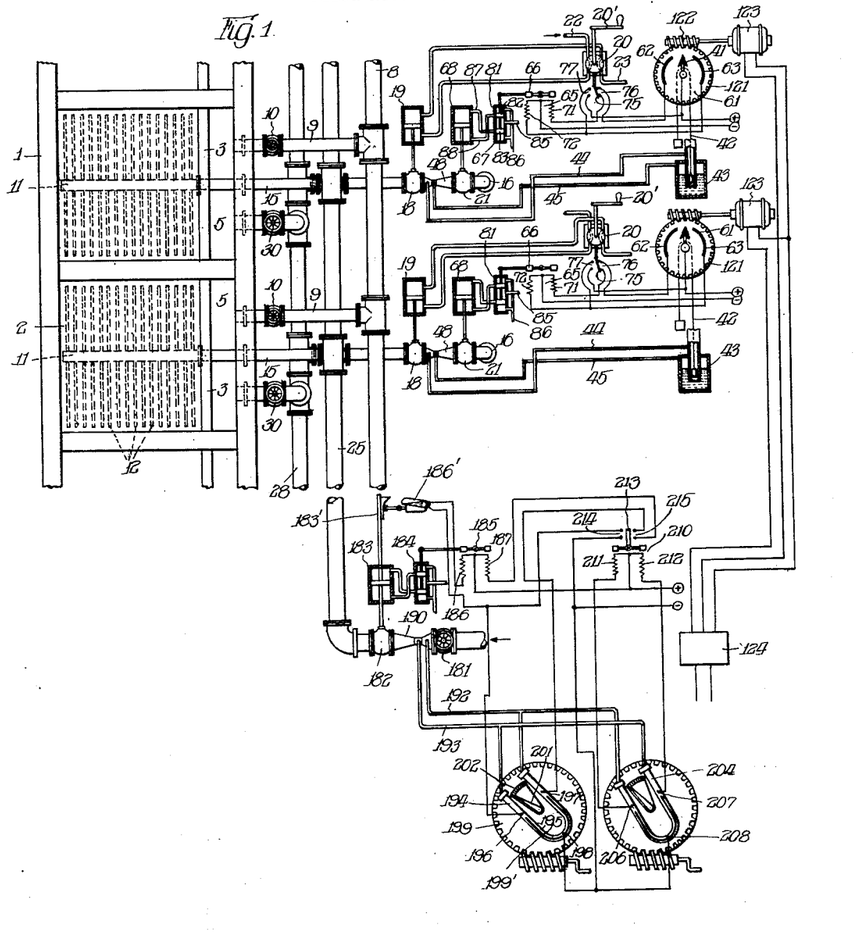
Fig. 1 is a plan view of a portion of a filtration plant with a diagrammatic illustration of control arrangements therefor.
Figure 2:
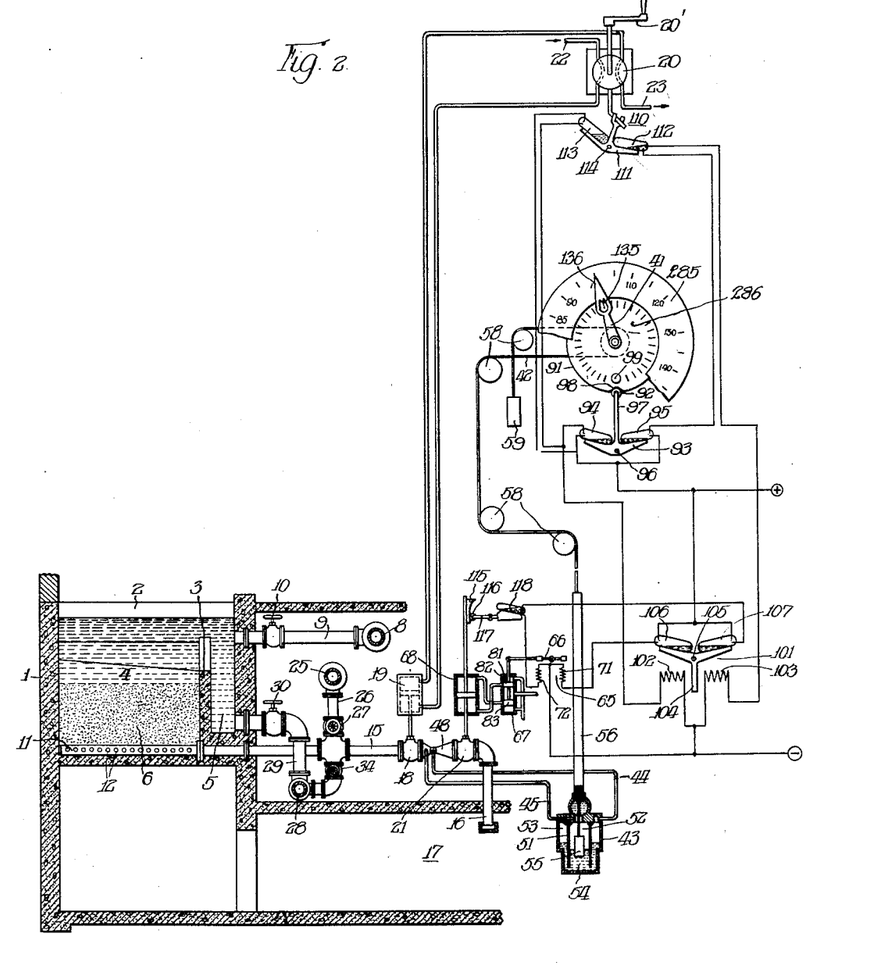
Fig. 2 is a vertical sectional view through one of the filter beds in Fig. 1 with a diagrammatic illustration of a control system therefor, the control system in Fig. 2 being of a more refined character than that of Fig. 1.

In Figs. 1 and 2 are illustrated the principal elements of a filtration plant used, for instance, in a municipality for purifying water that is to be distributed to the consumers. The impure water is collected in large storage tanks from which it is led to a plurality of filtration beds. From the beds the purified water flows to a clear water well from which it is then supplied to the water distributing mains. In the drawings there is shown a battery of such filter beds 1 disposed alongside each other in a row. Each bed unit consists of a box-like chamber 2 having a transverse partition wall 3 separating the main part of the chamber 4 from the relatively narrow overflow chamber 5. Within the main chamber 4 are the filtration beds 6 proper, composed of a series of suitable layers of gravel and sand adapted to separate from the downwardly flowing water impurities and contaminations. The impure water is supplied to the individual beds from a main influent line 8 running from large storage tanks (not shown) along the battery of beds and having branches 9 leading to the beds. Suitable influent valves 10 in the branches 9 serve to shut off the supply of the water to the beds.

The filtered water is collected in the individual beds by means of collecting pipes 11 provided with a plurality of branch pipes 12 extending horizontally from both sides of the collecting pipe, the branch pipes being perforated so that the water after passing through the beds enters these pipes and therethrough the collecting pipes. The collecting pipes 11 have connected thereto effluent lines 15 through which the purified water is led away at 16 to the clear water well 17 of the plant. The effluent lines may be shut off and the water flow to the clear well cut off by means of main effluent valves 18, these valves being remotely controlled by means of hydraulic motors that are in turn controlled by control valves 20 which are suitably operated, as by means of valve handles 20'. In the position of the control valves shown in the drawings, pressure fluid from a pressure line 22 is admitted to the lower side of the piston of the motor 19 to open the main effluent valve 18. To close the effluent valve, the control handle 20' is rotated 90°, thereby connecting the pressure line 22 with the space above the piston of the motor 19, and the space below the piston with the waste line 23.

In the course of the purification the filter bed 6 gradually accumulates impurities and sediments from the water passing therethrough to the clear water well. As a result, the bed becomes gradually more and more clogged and its resistance to the flow of water therethrough increases. For the satisfactory and efficient operation of such plants, it is extremely important to maintain a substantially constant rate of flow of the water from the filter bed to the clear water well, irrespective of the variations of the bed resistance. To this end there is provided in the effluent line an effluent regulating valve 21 the opening of which is controlled by a suitable regulating arrangement to compensate for the variations of the bed resistance so as to maintain a substantially constant rate of flow to the clear water well. The arrangement of the control mechanism for said regulating valve 21 and of the associated regulating apparatus, constitutes one of the features of the present invention and will be hereinafter fully described.

After a bed has been in operation for a certain time, the amount of sediment accumulated in the bed will become so large as to so far increase the flow resistance thereof that no further compensation can be effected by the regulating valve 21. As a result, the flow would tend to decrease. To avoid such flow decrease, provisions are made for washing the filter bed and removing therefrom the accumulated sediment. This is effected by means of a wash line 25 leading from a reservoir containing a wash water supply. The wash line is connected with the effluent line through branch pipes 26 having included therein wash line valves 27 for cutting off the connection between the wash line and the effluent lines. There is also provided a waste line 28 into which the wash water may flow off after having been sent through the bed, the waste line being connected with the overflow chambers 5 of the individual beds by means of suitable branch pipes 29 including waste line valves 30.

To wash a filter bed, the influent line is closed by means of the associated influent valve 10; the associated effluent valve 18 is likewise closed; the waste line valve 30 is opened letting the water above the filter bed and in the overflow chamber 5 out into the waste line 28; and the associated wash line valve 27 is opened, causing the wash water to flow into the effluent line in opposite direction to the normal clear water flow. The wash water is thus passed into the collector pipe 11, thence through the branch pipes 12 flowing outwardly through the layers of the bed, and, taking therewith the accumulated impurities and sediments, it proceeds by way of overflow chamber 5 and waste branch line 29 into the waste mains 28. The wash water is thus circulated for a short period of time, about six minutes, until the sediments are washed off. After the bed has been purified, waste line valve 30 and wash line valve 27 are closed and the influent valve 10 again opened, again admitting water to the bed 6 from the influent line 8. The first flow of water through the bed is not sent directly into the clear water well, but is permitted to flow into the waste line to remove any leftover loose sediments, there being provided auxiliary branch pipes 33 between the effluent lines 15 and the waste lines 28 into which the clear water flow may be diverted by means of valves 34. After re-washing the bed 6 by permitting a certain amount of clear water to flow into the waste line through the branch pipe 33, the associated valve 34 is again closed and the main effluent valve 18 opened to cause the clear water to flow again into the clear water well.

In order to supervise the operation of a plant, the individual beds are provided with water flow gauges for indicating the rate of water flow in the effluent line. In the diagrammatic view of Fig. 1 the water flow gauge is represented by the hand 41 which is rotated over a suitable dial by means of a pull cable 42 that is actuated by means of a float disposed in a suitable barometric vessel indicated at 43. The pressure conditions in the vessel 43 are controlled by means of two pipe lines 44 and 45 leading to the throat and upstream portions of a Venturi tube 48 included in the effluent line, for instance, between the main valve 18 and the regulating valve 21.

The barometric vessel 43 consists of a closed pot built on the principle of a U-shaped tube having a barometric sealing liquid in the lower closed portion thereof. The pot has projecting from the top thereof a cylindrical partition wall 51 extending toward the bottom of the pot and dividing the same into a central space 52 and a circular space 53. The lower portion of the pot is filled with a body of mercury 54, and a float 55 is held in the mercury body occupying the central space 52 of the pot. Extending above the central space of the pot and communicating therewith is a guide pipe 56 through which the pull cable 42 that is connected to the float 55 is led to the indicating hand of the flow gauge. The pull cable may be suitably guided on rollers 58, as shown in Fig. 2, and has on its other end a counterbalancing weight 59 so as to effectively transmit to the hand 41 any variations of the level of the mercury body 54 in the central portion 52 of the pot. The pipe line 44 leading from the throat portion of the Venturi tube 48 is connected to the outer space 53 of the pot, and the second pipe 45 leading from the upstream side of the Venturi tube is connected to the central space of the pot.

Any change in the velocity of the flow through the effluent pipe 15 will vary the pressure difference between the upstream end and the throat portion of the Venturi tube 48. This change of the pressure difference will be communicated through the pipes 44 and 45 to the spaces 52 and 53 above the mercury columns in the pot 43. A decrease of the flow velocity, for instance, will decrease the pressure difference, causing the mercury in the outer space 53 to drop and that in the central space to rise. The rising mercury in the central space 52 will lift the float 55, causing the pull cable 42 to turn the hand 41 in counterclockwise direction until it is brought to a position corresponding to the changed velocity of flow in the effluent line.

According to the invention, the foregoing apparatus for gauging or measuring the velocity or rate of flow of the purified water in the effluent line is also utilized as a part of a regulating apparatus for controlling the regulating valve 21 in the effluent line so as to maintain a substantially constant rate of flow in said line, irrespective of the variations of the bed resistance.

A diagrammatic illustration of the regulating apparatus in somewhat simplified form, is shown in Fig. 1. Arranged in cooperative relationship with the gauge hand 41 there is a contact-supporting plate 61 having mounted thereon a pair of contact members 62 and 63 adapted to be engaged by the hand 41 when the velocity of the liquid in the effluent line falls below, or rises above, predetermined minimum and maximum values, respectively. The hand 41 with the two contact members 62 and 63 act as a flow regulator and to this end, are connected to the operating circuit of a relay 65 which in turn actuates through its armature 66, a pilot valve 67 by means of which a control motor 68 of the regulating valve 21 is operated.

The relay 65 comprises two actuating coils 71 and 72 connected to a common point which leads to one pole of a source of electric current, indicated by the minus sign (−). The two other terminals of the two coils are connected to the contact members 62 and 63, respectively, that cooperate with the gauge hand 41, the latter being connected to the other pole of the electric energy source, indicated by the plus sign (+).

There is also provided an interlocking switch 75 which is directly controlled by the control valve 20 of the main effluent valve 18. The interlocking switch 75 has two pair of contact members 76 and 77, the first pair of contact members 76 being disposed in the energizing line of the relay coil 71 so as to open said energizing line when the contact members are not closed by the switching member 75. The other pair of contact members 77 is connected in parallel to the hand 41 and the contact member 63 to establish an energizing circuit for relay coil 72 independently of the position of the hand 41. The arrangement of the actuating valve 20 and the switch 75 is such that when said valve is in a position, as shown in Fig. 1, at which pressure fluid is admitted to the lower side of the piston in the control motor 19 to open the main effluent valve 18, the contact members 76 are closed so as to permit energization of either of the actuating coils 71 and 72 of the relay 65.

The pilot valve 67 consists of a small cylinder 81 and a pair of pistons 82 and 83 for controlling the connections of the hydraulic motor 68 with the pressure fluid supply line 85 and the waste line 86. The two pistons 82 and 83 are suitably mounted on a common operating rod which is in turn actuated by the armature 66 of the relay 65. Under normal condition, when neither of the coils 71 or 72 is energized, the armature 66 is arranged to remain in neutral position so that the pistons 82 and 83 of the pilot valve cut off the pressure fluid supply line 85, from connecting lines 87 and 88, to the spaces above and below the piston in the regulating motor 68. In this position of the pilot valve, the piston of the motor 68 will be held stationary, thereby maintaining a definite opening in the regulating valve 21.

Assuming now that on account of the accumulation of sediment in the bed the resistance thereof has increased so far as to produce a decrease in the velocity of the flow in the effluent line to a point below the desired minimum value, then the gauge hand 41 will have moved so far in counterclockwise direction as to establish contact with the contact member 62. This completes a circuit from the positive pole (+) of the supply line through the hand 41, contact member 62, interlocking contact 76, to the actuating coil 71, and thence to the negative pole (−) of the supply line. As a result, the centrally pivoted armature 66 will be turned to the right, pulling up the pistons 82 and 83 in the pilot valve 67 and causing the piston in the control motor 68 to move upwardly, thereby widening the opening of the regulating valve 21. The increase in the velocity of the flow resulting from this action of the valve 21 will immediately manifest itself by a change in the pressure difference transmitted from the Venturi tube 48 to the barometric vessel 43, causing in turn the hand 41 to be moved to a position corresponding to the higher flow velocity. The return of the hand 41 interrupts the energizing circuit of the coil 71, causing the relay armature 66 to return to its neutral position, thereby stopping the piston of the motor 68 and holding it with the associated valve 21 in its new position.

On the other hand, if the flow of velocity or the rate of flow in the effluent line should increase above the maximum permissible value, the hand 41 would move in clockwise direction until it contacts with the contact member 63, energizing the relay coil 72 and actuating the relay armature 66 to move the pistons 82 and 83 of the pilot valve 67 in downward direction. This connects the space above the piston in the motor 68 with the fluid pressure supply, and the space below the piston with the waste line, causing the piston to move in downward direction to reduce the opening in the valve until the resulting decrease in the flow velocity causes the gauge hand 41 to move back to its normal position. The return of the hand 41 de-energizes the relay coil 72 causing the armature 66 to return to neutral and again lock the piston of the motor 68 in the new position.

Special provisions are also made in the control system according to the invention for preventing damage to the filter beds that might be caused by the regulator action when the effluent valve is opened subsequent to completion of the washing of a bed. If, namely, a filter bed is to be washed and the associated effluent valve 18 closed, the hand 41 of the regulator will automatically move to a low velocity position establishing contact with the contact member 62. As a result, the relay 65 would operate to cause the regulating valve 21 in the effluent line to open wide. Upon completion of the washing process and opening of the main effluent valve 18, the wide opening in the regulating valve would cause a rush of water down through the filter bed and out into the clear water well, the bed now having its lowest flow resistance. It will ordinarily take an appreciable time for the regulating apparatus to close the regulating valve to the point at which the flow will be normal. During this period, the excessive speed of the water flow down through the filter bed may carry with it sediment and other objectionable material contaminating the bed and the water in the clear well.

To avoid such very serious damages, the improved regulator of my invention is provided with a special arrangement for causing the regulating valve to be brought to its closed position whenever the main effluent valve is closed. This is effected by means of the interlocking switch 75 described hereinabove, the switch being operated in conjunction with the control valve 20 by means of which the main effluent valve 18 is closed or opened. When the control valve 20 is in a position where it holds the main effluent valve 18 open, the switching member 75 is in the position shown in the drawing at which the contact members 76 are close circuited, establishing operating connections to the relay coil 71, as well as to the relay coil 72 of the relay 65. However, when the handle 20' is rotated to bring the valve 20 to the position wherein the effluent valve 18 is closed, the connection between the contact members 76 is interrupted, de-energizing the relay coil 71; and a closed circuit is established across the contact members 77, thereby energizing relay coil 72. This cuts off the further action of the regulator hand 41 upon the relay 65. Since the relay coil 71 is now de-energized and relay coil 72 energized, the pilot valve pistons will be moved downwardly, causing the regulating valve 21 to close. When the effluent valve is opened after a washing operation, the regulating valve 21 will be found in a relatively closed position, and there will be no rush of water through the filter bed. On the contrary, it will take a certain amount of time before the regulator action, which has now been restored by turning the handle 20' with the associated interlocking switch 75 to the open position, will gradually open the regulating valve 21, thereby increasing the flow to the desired normal rate, as set by the regulator. In this way there is automatically secured the desired regulating action during the normal operation of the filter bed, while any damage that may be caused to the bed on account of said regulator action incident to the bed washing operations, is positively excluded.

The regulator arrangement shown in Fig. 2 is more elaborate than that of Fig. 1 and represents the apparatus used in practical installations. The gauge instrument, which is shown in section in Fig. 3, comprises, in addition to the hand 41, a suitably journaled main shaft 281 having a somewhat enlarged front portion 282. The hand 41 is mounted in front of the enlarged shaft portion 282 and is circumferentially locked thereagainst, as by means of a pin 283. The hand 41 is arranged to cooperate with two dials, a stationary dial 285 and a movable re-set dial 286, the latter being carried on a bushing 287 which is journaled on the enlarged shaft portion 282. The bushing is prevented against longitudinal movement on said shaft portion 282 by a suitable projection or collar 288 on the shaft, and may be clamped to the shaft by means of a releasing screw 89 on the front portion of the shaft. On the shaft 281 there is also secured a grooved pulley 89 over which the pull cable 42 is wound so as to transmit the movement of the float 55 to the pulley and therethrough to the shaft 281.

The bushing 287 carries also a cam 91 cooperating with a roller member 92 of a switch mechanism 93, best shown in Fig. 2. The switch mechanism 93 comprises a supporting member on which are mounted two mercury switches 94, 95, the supporting member being suitably pivoted at 96, and having an actuating arm 97 carrying at its upper end the roller 92. Both the stationary as well as the reset dial are provided with the corresponding scales indicative, for instance, of the rate of flow, or some other constant corresponding thereto.

The cam 91 is provided with a depression 98 which is so arranged that when the re-set dial 286 is in the position where its scale is in alignment with that of the stationary dial 285, the roller 92 will come into the depression with the actuating arm 97 held in substantially vertical position, or in general, in its normal position at which the switching contacts in the mercury switches 94, 95 are open.

On releasing the releasing screw 89, the re-set dial 286 may be rotated either to the right or to the left by means of a knob 99. Such rotation of the re-set dial will cause the cam 91 to tip the supporting member of the switch 93 either to the right or to the left, thereby close-circuiting the contacts of either one or the other of the mercury switches 94 and 95. The two mercury switches 94 and 95 serve in turn for the energization of a relay switch 101 having two energizing coils 102, 103 which act upon an armature 104, tipping the same around its pivot 105 either to the right or to the left.

The armature 104 carries two mercury switches 106 and 107 which in turn control the energization of the relay 65, described hereinbefore in connection with the regulating arrangement of Fig. 1. The energizing circuit for the relay 101 comprises a lead from one pole of the supply source, indicated by the plus sign (+), connected to one of the contact members of each of the mercury switches 94 and 95; leads from the other contact members of the two mercury switches 94 and 95 to one set of terminals of the two relay coils 102 and 103; and a lead from the common connecting point of the other terminals of the relay coils 102 and 103 to the other pole of the supply source, indicated by the minus sign (−). In a similar way, the mercury switches 105 and 106 are arranged to control the energization of the relay 65, one set of terminals of said two switches being connected to the plus terminal (+) of the supply line, and the other set of terminals being connected to the end terminals of the relay coil 71 and 72, the mid point of the two relay coils being connected to the minus pole (−) of the supply source.

The operation of the regulating arrangement is as follows: In case the flow velocity in the effluent line 15 decreases below the pre-set minimum value, the reduction in the pressure difference between the outer space 53 and inner space 52 in the barometric pot 43, will cause the float 55 to be lifted. Thereupon the cable 42 will turn the pulley 89 with the associated shaft 281 and hand 41 toward the left. The bushing 287 with the re-set dial 286 and the cam 91 are normally held in locked position with respect to the shaft, and the rotation of the shaft in counterclockwise direction, will accordingly cause the cam 91 to tip the actuating arm 97 of the switch 93 toward the right, establishing a contact between the contact members of the mercury switch 95. This completes the circuit from the plus (+) terminal of the supply source through the switch 95 to the relay coil 103 and thence to the minus (−) pole of the supply source.

Relay coil 103, on being energized, pulls up the armature 104, tipping the mercury in the mercury switch 106 so as to close the contacts thereof, thereby establishing an energizing circuit for the relay coil 71 of relay 65. Relay coil 71 thereupon pulls down the righthand side of the armature 66, thereby actuating the pilot valve 67 to cause the regulator valve 21 to open.

The opening of the regulator valve increases the flow in the effluent line 15, this increase being communicated through the pressure pipes 44 and 45 to the barometric pot 43. The increased pressure difference between the outer and inner space in the barometric pot 43 causes the mercury in the central space to drop down, lowering the float 55 and causing in turn the pull cable 42 to move the hand 41 and the associated elements back to the normal position. With the return of the hand 41 to its normal position, the associated cam 91 is also returned to the normal position, bringing the cam roller 92 into the depression 98. This returns the switch 93 to its normal position as shown in the drawing, in which the circuit connection in the mercury switch 95 is opened, de-energizing relay coil 103, which in turn de-energizes the relay coil 71. Thereupon the armature 66 is released and the pilot valve 67 is returned to neutral, locking the regulating valve 21 in the new position.

In the case of an increase of the flow above the maximum rate, a similar sequence of operations takes place. The hand 41 is moved in clockwise direction, causing the cam 91 to tip the switch arm 97 to the left, closing the contacts in the mercury switch 94, thereby energizing relay coil 102, which in turn pulls up armature 104 and closes the circuit in the mercury switch 107 which energizes relay coil 72. The energization of relay coil 72 pulls down the left hand side of the armature 66, actuating the pilot valve 67 to cause the motor 68 to reduce the opening of the regulating valve 21. As soon as the reduction of the clearance in the regulating valve 21 has caused the flow to become reduced, the hand 41 will be returned to normal, and with it the cam 91 will be moved to the position at which the switch 93 is returned to its normal position, thereby de-energizing the relay coils 102 and 72, returning the relay 65 and pilot valve 67 to neutral positions.

As in the arrangement described in connection with Fig. 1, that of Fig. 2 also includes provisions for preventing damage to the filter bed by reason of the regulator action during the period immediately following the opening of the main effluent valve after a washing operation. This is secured by a special interlocking switch mechanism 110 which is associated with the control valve 20 which actuates the main effluent valve 18.

The switch mechanism 110 comprises a supporting member 111 carrying two mercury switches 112 and 113, the first switch 112 having a pair of contact members disposed in the circuit of the regulator switch 95 so that the circuit controlled by the switch 93 may be energized only if the contacts in the switch 112 are closed. The switch 113 is arranged in parallel to the switch 94 so that the closure of the contacts in the switch 113 results in the same kind of regulator setting as is effected by the closure of contacts in the switch 94.

The switch-supporting member 111 is pivotally mounted at 114 and is arranged to be actuated, by a suitable interlocking lever on the control mechanisms of the valve 20, so that when said valve is in the position where the main effluent valve 18 is held open, as shown in the drawing, the switch 113 is opened and the switch 112 is closed. In this position of the control valve 20 the regulating mechanism will be operated and maintain the desired rate of flow as described above. However, if the valve 18 is to be closed for washing operations, and the like, and the control valve 20 turned 90°, the supporting member 111 will be tipped to the left, causing the switch 112 to open and switch 113 to close. Thereupon relay coil 102 will be energized and relay coil 103 held de-energized irrespective of the position of the hand 41. As a result, the relay coil 72 will be energized, and the pilot valve 67 will move to a position where the regulating valve 21 is being closed.

The arrangement of Fig. 2 is also provided with a special mechanism for adjustably limiting the closure of the regulating valve 21. To this end, the piston rod of the regulating motor 68 carries a cam 115 that cooperates with a cam roller 116 of a lever 117 upon which is mounted a cut-out switch 118 that is included in the circuit to the relay coil 72.

Under normal conditions, when the regulating valve 21 has an opening that is wider than a predetermined minimum value, the cam roller 116 will cooperate with a portion of the cam 115 at which the lever 117 is held in a position so that the switch 118 is closed, maintaining the circuit to the coil 72. However, if the piston in the motor 68 is moved so far downwardly as to bring the regulating valve 21 to its predetermined minimum width, the projecting portion of the cam 115 will cause the roller 116 to tip the lever 117 so as to open the switch 118 thereby interrupting the circuit to the relay coil 72. The relay coil 72 will thus be de-energized and the armature 66 return to neutral position placing pilot valve 67 in neutral and stopping closing motion of valve 21.

The improved arrangement for controlling and regulating the filter plant described above is also provided with a master control mechanism for readily varying the rate of flow or the setting of the regulators of the individual filter beds from a central point. One such arrangement is indicated diagrammatically in Fig. 1. Each of the supporting plates 61 of the regulating mechanism is associated with a suitable gear wheel 121, which is in turn engaged by a worm 122 that is arranged to be driven by a synchronous stepping motor 123. Rotary movement of the stepping motor 123 will cause rotation of the supporting plate 61 of the contact members 62 and 63, thereby varying the relationship between the contact members and the hand 41 cooperating therewith, The range of the control action of the hand 41 may thus be readily changed. For instance, if it is desired to increase the rate of flow, the supporting plate 61 will be turned in clockwise direction. If it is desired to decrease the rate of flow, the supporting plate 61 will be rotated in counterclockwise direction. The stepping motors 123 may be of any well known type, such as are commonly used in automatic telegraphy and telephony, and are arranged to permit control of their respective positions from a central point by means of a master controller shown diagrammatically at 124.

Figure 3:
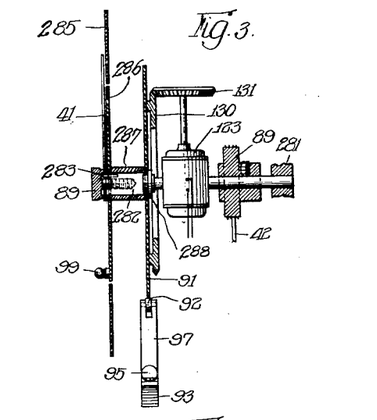
Fig. 3 is a vertical sectional view through the regulator control dial and the associated elements of the control arrangement in Fig. 2.

Such a master controller arrangement may also readily be combined with a regulator apparatus of the type shown in Figs. 2 and 3. To this end, the cam 91 is provided with a gear wheel 130 arranged to be driven by a pinion 131 that is in turn rotated by the stepping motor 123, the latter being fixedly mounted on the shaft 281. The foregoing arrangement permits changing the setting of the regulator and of the rate of flow, either manually or by means of the stepping motor 123. If the rate of flow is to be adjusted manually, for instance increased, the releasing screw 89 is loosened and thereupon the re-set dial 286 rotated by means of the knob 99 until the inner pointer 135 points to the higher rate of flow on the scale of the re-set dial 286. Thereupon the screw 89 is locked and the regulator permitted to operate. The rotation of the re-set dial is accompanied by a corresponding rotation of the cam 91 which in turn causes the switch mechanism 93 to operate in the same way as if the hand 41 had caused corresponding movement of the cam 91. As a result, the relay 65 will be actuated to cause the regulator valve 21 to open until the flow has reached the rate corresponding to the indication of the inner pointer 135 on the re-set dial. When the new position of the regulating valve has been reached, the float 55 will have moved the shaft 281 with the hand 41 and the associated cam 91 to a position where the cam roller 92 is again in the depression 98 on the cam and the outer pointer 136 on the hand 41 is opposite the same point of the scale on the stationary dial as the inner pointer is on the re-set dial.

When changes in the rate of flow setting are to be effected by remote control, the release screw 89 is left untightened to permit movement of the re-set dial with the associated cam by the stepping motor 123. It is thus possible to move the cam 91 with the re-set dial 286 to any desired annular position with respect to the hand 41 whereupon the same sequence of action will take place as was described hereinbefore with the manual change of the setting of the re-set dial 286.

Figure 4:
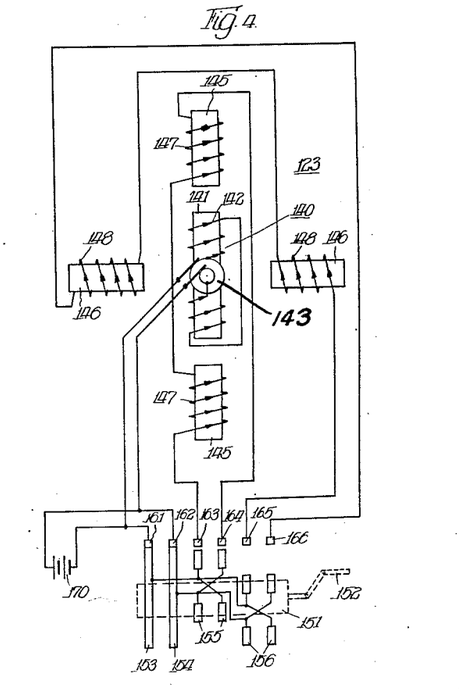
Fig. 4 is a circuit diagram of the remote control system for the flow controllers in a plant such as shown in Figs. 1 and 2.

In Fig. 4 is shown one form of the stepping motor and the associated master controller that may be used for remotely setting the regulators of the individual filter beds. The motor may comprise an armature in the form of a two pole rotatably mounted core 141 provided with a magnetizing winding 142 that is connected to two slip rings 143 by means of which it may be energized. The armature cooperates with a stator comprising two pole pairs 145 and 146 disposed against each other 90° and so arranged that on rotating the armature, its core will successively align itself with one pole pair 145 and with the other pole pair 146. The pole pair 145 is arranged to be energized by a set of windings 147 and the other pole pair 146 is arranged to be energized by a set of windings 148.

The master controller 124 consists of a commutator arranged to successively energize the windings 147 and 148 of the stepping motor so as to produce rotation of the magnetic field in one direction or the other and thereby cause rotation of the motor armature 140. In its simplest form, the commutator comprises a drum 151, that may be rotated by means of a handle 152, and a plurality of commutator segments 153 to 156 which are shown in developed view. The segments cooperate with brushes 161 to 166 that lead to the windings 142, 147, 148 of the stepping motor. A source of current, indicated by a storage battery 170, is suitably connected between the brushes 161 and 162. The segments 153 to 156 of the commutator are suitably interconnected so that on rotating the drum 151 through 360 degrees the windings of the motor 123 will be cyclically energized and will rotate the armature 140 through 360 degrees in one direction or the other depending on the direction of rotation of the commutator drum 151.

In the filter plants used heretofore, it was difficult to control and regulate the washing operations. It is important that the wash water flow through the beds in upward direction shall be maintained at a definite rate. According to my invention, I secure this result by means of a single control arrangement disposed in the wash line and organized so as to control the washing operations in either of the beds that are to be washed. Such arrangement is shown in Fig. 1. Included in the connection between the wash line and the wash water supply, there is a main wash line valve 181 and a wash line regulating valve 182, the latter being operated by a hydraulic motor 183 which is in turn controlled by a pilot valve 184 that may be actuated by a relay 185 having two actuating coils 186 and 187. The regulating valve 182, with the associated operating mechanisms, is similar to the valve and the mechanism of the regulating valve 21 in the effluent line described above.

Included in the wash water line is also a Venturi tube 190 which has two pressure line connections 192 and 193 to a barometric vessel in the form of a U-shaped tube 194, that has its lower portion filled with mercury 195. The arms of the U-shaped tube 194 carry two contact members 196 and 197, and one contact member 198 is provided in the lower portion of the tube in contact with the mercury. The contact members 196 and 197 are so arranged that under normal conditions they are slightly above the level of the mercury within the tube. However, if there is a pressure difference between the spaces above the mercury columns in the two arms of the tubes, and the mercury rises in one of the arms, contact will be established between the corresponding contact member of the arm and the mercury column, thereby completing a circuit to the contact member 198 in the lower portion of the arm.

The three contact members 196 to 198 are suitably arranged in the energizing circuits leading from the terminals of a supply source indicated by the plus (+) and minus (−) signs, one pole of the supply source being connected to the mid point of the relay coils 186 and 187, the end terminals of said coils leading to the contact members 196 and 197. The contact member 198 is connected to the other pole of the supply source.

The regulating action will be similar to that obtained with the regulator arrangement of the effluent line described above. For a particular setting of the barometric tube 194, the relay 185 will so actuate the associated pilot valve and control member 183 as to open the regulating valve 182 to a point where the flow therethrough will maintain the pressures in the spaces above the mercury columns in the two arms of the tube at such a differential as to hold the mercury out of contact with the contact members 196 and 197. Should the wash water flow increase above a predetermined value, the pressure difference between the spaces in the two arms of the tube will increase, causing the mercury column in the lefthand arm of the tube to rise until contact is made with the contact member 196. This establishes an energizing circuit for relay coil 186 which in turn actuates the pilot valve 184 to cause the motor 183 to reduce the opening in the valve 182. The ensuing reduction of the flow velocity will again reduce the pressure difference between the two arms of the tube, permitting the mercury column to reach its former position interrupting at the contact 196 and thereby bringing the pilot valve 184 again to its neutral position.

The operation in case of a decrease of the rate of flow is similar. The action of the Venturi tube will cause the mercury in the righthand arm of the barometric tube to rise, establishing contact with the contact member 197 and completing an energizing circuit for the relay coil 187, whereupon the pilot valve 184 will cause the regulator valve 182 to open until a position is reached at which the Venturi tube has again established normal pressure conditions at which the contact of the mercury column with the contact member 197 is opened.

The rate of flow of the wash water may be readily changed and the regulator setting varied by placing the barometric tube 194 at a suitable angle. To this end the tube is shown mounted on a supporting plate 199 which is pivoted at 199' to permit rotation thereof in a vertical plane so as to vary the angle at which the tube is held. A pointer 201 cooperating with a suitable scale 202 on the supporting plate 199 permits calibration of the regulator and ready setting thereof.

As described hereinabove, the individual beds are washed by admitting the wash water through the wash line valves 27 associated with the individual effluent lines 15. For the satisfactory and efficient operation it is important that the operator who opens or closes the wash line valves 27 should not be required to supervise the action of the main wash line valve 181 or of the wash line regulator valve 182.

However, with the arrangement as described hereinabove, cessation of water flow in the wash line 25 upon completion of a washing operation, would cause the regulating mechanism, including the barometric tube 194, to act upon the relay 185 so as to cause the regulator valve 182 to be wide open. If, thereupon, the next filter bed is to be washed, and the associated wash line valve 27 is opened, the wide open regulator valve 182 would permit the wash water to rush into the filter bed endangering the structure thereof.

While it would be feasible to provide on each of the wash water valves 27 an interlocking switch that would control the energization of the relay 185 in a manner similar to the action of the interlocking switch 75 in the effluent line regulator, this would prove cumbersome.

According to the invention, I secure automatic re-setting of the regulating valve to a predetermined semi-closed position by means of a special compensating apparatus comprising a barometric tube 204 similar to the barometric tube 194 described hereinabove. Barometric tube 204 is also connected to the Venturi tube 190 like the first mentioned barometric tube and has three similarly arranged contact members 206, 207 and 208. The contact members of the second barometric tube 204 control the energization of an auxiliary relay 210 comprising two actuating coils 211 and 212, and an armature having a switching member 213 cooperating with two sets of contact members 214 and 215.

The compensating apparatus including the second barometric tube 204 and the relay 210 are so arranged as to cut out the action of the regulator 198 and cause the wash line regulating valve 182 to move to a semi-closed position whenever the flow of wash water in the wash line drops below a predetermined value. Accordingly, if the wash line valves 27 are closed and the wash water flow is stopped, the compensating tube 204 will cut out the regulator action and will cause the regulator valve 182 to reduce the width of the clearance of the valve. According to the invention the regulator valve is not fully closed but has a minimum opening. This is very advantageous, since otherwise the wash water flow would start at a rate too low to be efficient and wash water would be wasted. When at the next washing a washing valve is again opened, the ensuing flow of the wash water through the partially open regulator valve is arranged to cause the compensating tube 204 to again restore the action of the regulator tube 194 until the wash water flow is again reduced by closing the wash water valve.

The foregoing action of the compensating tube 204 is obtained as follows: The two contact members 206 and 207 on the tube are connected to two end terminals of the relay coils 211 and 212 of the relay 210, the midpoint of the two coils and the lower terminal 208 of the tube being connected to the positive and negative pole of the supply source, respectively. The contact members 215 of the relay 210 are included in the circuit of the relay coil 187 of the operating relay 185 of the pilot valve 184. The contact members 214 of the relay 210 are connected in parallel to the contact members 196 and 198 of the regulator tube 194 so as to establish independently of said tube an energizing circuit for the relay coil 186 of the regulator relay 185. The tube 204 is supported under such angle that throughout the entire normal regulating range, the mercury column in said tube will be in engagement with the contact member 207, thereby holding the relay coil 212 energized. This causes the armature switch 213 to close the contacts 215, thereby maintaining the circuit to relay coil 187 of the regulator relay 185. In this condition the regulator 194 will perform its regulating functions in the way described hereinabove, maintaining the desired rate of flow of the wash water as determined by the angular position of the tube 194. However, if the wash water valves are all closed and the wash water flow in the wash line 25 has dropped to nearly zero, the pressure difference between the two arms of the tube 204 will disappear and the mercury in the right-hand arm will drop down, interrupting the engagement with the contact member 207 and establishing engagement with the contact member 206 in the other arm. This de-energizes relay coil 212 and energizes relay coil 211, tipping the armature switch 213 from the right to the left. The circuit connection at the contact members 215 to the relay coil 187 will thereupon be opened, cutting off the regulating action that tends to open the regulator valve 182; and the contact 214 will be closed, causing energization of the relay coil 186 independent of the action of the relay tube 194, and producing, in consequence, closing movement of the regulator valve 182 as explained hereinabove.

As seen in the drawings, an auxiliary switch 186' is arranged in circuit with the closing coil 186 of the relay 185, the switch being mounted for actuation by the tail rod 183' of the regulating valve 182. Normally when the regulating valve 182 is open wider than the desired minimum, the switch 186' will be closed and the regulating and compensating actions will take place, as described above. However, when the regulating valve 182 is moved to its closed positon and the opening reaches the minimum predetermined value, the switch 186' opens interrupting the energizing circuit for the closing coil 186 and thereby stopping the further closing movement of the valve. The prevention of complete closure of the regulating valve 182 is important as otherwise no flow through the wash line could be established to start the action of the regulating mechanism, as described above.

The principles of the invention are not limited to the precise details of construction and arrangements described and shown hereinabove. The essential features thereof, namely, the improved regulating and control system of the clear water flow in the effluent line; the novel flow gauging mechanism and the regulator apparatus controlled by said gauging mechanism; the interlocking of the operations of the regulator apparatus with the effluent line valves; the utilization of relay mechanisms arranged to cause the regulator valves to either move to closed position or to open position, or to remain in neutral position; the improved wash line control and regulating system which effects a predetermined regulating action during the washing operation and automatically causes reduction of the clearance of the regulator valve on termination of the washing operation; and the other novel features of construction and operation described in detail hereinabove will suggest to those skilled in the art many modifications thereof. Likewise, the mechanism utilizing the U-shaped barometric tubes, such as shown in connection with the wash water regulator, may be used in place of the barometric vessel with the float, such as shown in connection with the effluent line regulator, and vice versa, or any other suitable mechanism used instead. It is accordingly desired that the appended claims be given a broad construction commensurate with the scope of the invention within the art.

I claim:

1. In a filtration plant including a filter bed, an effluent line from said filter bed, a main valve in said effluent line for cutting off the flow from said filter bed, a regulating valve in said effluent line for maintaining predetermined flow conditions in said line, electric relay means for governing operation of said regulating valve to open or close the same, means responsive to the flow in said effluent line for actuating said relay to cause reduction of the opening of said regulating valve in response to an increase in the flow of said line and widening of the opening of said regulating valve in response to a decrease of flow in said line, and means responsive to the condition of said main valve for cutting out the regulating action of said regulating valve.

2. In a filtration plant including a filter bed, an effluent line leading from said filter bed, a main valve in said line for shutting off the flow from said filter bed, a regulating valve in said line for controlling the flow therein, means responsive to an increase or decrease of flow in said line for closing and widening, respectively, the opening in said regulating valve to maintain substantially uniform flow conditions in said line irrespective of the flow resistance of said bed, and means responsive to the positioning of said main valve for cutting out or in the regulating action of said flow responsive means.

3. In a filtration plant including a filter bed, and an effluent line from said filter bed, a main valve in said line for shutting off the flow from said filter bed, a regulating valve in said line for varying the opening thereof to control the flow in said line, electric relay means for governing operation of said regulating valve, means responsive to an increase and decrease, respectively, of the flow in said line for controlling the energization of said relay means to cause closure and widening of the opening of said regulating valve, and switching means operated in response to the closure or opening of said main valve for cutting off the regulating action of said flow responsive means upon said relay means.

4. A flow control system comprising a conduit adapted to circulate a fluid, a main valve in said conduit for cutting off the fluid circulation, a regulating valve in said conduit for controlling the magnitude of the flow therein, electric relay means for governing said regulating valve to vary the opening thereof, energizing circuits for said relay means, switching means responsive to the increase and decrease of the flow in said conduit for establishing energizing circuits causing said relay means to close and widen the opening of said regulating valve, and additional switching means actuated in response to the closure and opening of said main valve to control said energizing circuits so as to cut out the regulating action of said flow responsive means and cause closure of said regulating valve in response to closure of said main valve and restore the regulating action of said flow responsive means in response to the opening of said main valve.

5. A filtration plant control system comprising in combination, a filter bed, an effluent line from said filter bed, a main valve in said effluent line for shutting off the flow from said bed, a regulating valve in said line, electric relay means for governing operation of said regulating valve to widen or close the opening thereof for controlling the magniture of the flow in said line, switching means actuated in response to the increase and decrease of the flow in said line for establishing energizing circuits for said relay means to cause closure and widening of the opening of said regulating valve, respectively, and additional switching means actuated by the opening and closure of said main valve for establishing energizing circuits for said relay means to produce closure of said regulating valve in response to the closure of said main valve irrespective of the control action of said flow responsive means and for restoring said control action in response to the opening of said main valve.

6. In a flow control system, a conduit for the fluid the flow of which is to be controlled, a regulating valve in said conduit for controlling the magnitude of flow in said conduit, a pilot valve and means in association with said pilot valve for actuating said regulating valve, a Venturi tube in said conduit, a barometric vessel having two differential pressure spaces connected to two differential pressure points on said Venturi tube, a barometric fluid in said vessel, electric relay means for operating said pilot valve, and switching means for controlling the energization of said relay means in response to the movement of the barometric liquid in said barometric vessel.

7. In a system of the class described, a conduit for the liquid to be regulated, a regulating valve in said conduit for controlling the magnitude of the flow in said conduit, a pilot valve and means in association with said pilot valve for actuating said regulating valve, a flow gauge responsive to the variations in the rate of flow in said conduit, electric relay means for actuating said pilot valve to close and widen the opening of the regulating valve, and switching means associated with said flow gauge to establish energizing circuits for said relay means.

8. In a system of the class described, a conduit for conducting a liquid under a pressure head, a regulating valve in said conduit for controlling the magnitude of the flow therein, a flow gauge for indicating the magnitude of the flow in said conduit, electric relay means for controlling operation of said regulating valve to close and widen the opening thereof, switching means associated with said flow gauge to establish energizing circuits for said relay means to cause reduction of the opening of said valve and widening of the opening of said valve, respectively, in response to an increase and decrease of the indication of said gauge, a main valve in said conduit for interrupting the flow therein, and interlocking switching means associated with said main valve for establishing an energizing circuit for said relay to produce closure of said regulating valve in response to closure of said main valve irrespective of the action of said flow gauge switching means and for restoring the control action of said flow gauge switching means in response to the opening of said main valve.

9. In a fluid control system, a conduit for conducting the regulated liquid under a pressure head, a regulating valve in said conduit for controlling the magnitude of flow in said conduit, a pilot valve, and means in association with said pilot valve for actuating said regulating valve, a motor for operating said pilot valve, an electric relay for controlling said motor, said relay having a neutral position in which said motor holds said pilot valve stationary, a closing position in which said motor actuates said pilot valve to reduce the width of the opening of the regulating valve, and an opening position in which said motor actuates said pilot valve to widen the opening of the regulating valve, a flow gauge having an element movably responsive to variations in the rate of flow of liquid in said conduit, and switching means operated by said movable element for establishing an opening energizing circuit for said relay and a closing energizing circuit for said relay whereby said relay is brought either to the opening position or to the closing position, said switching means being so arranged with respect to said movable element as to establish the closing energizing circuit upon an increase of flow above a predetermined maximum point and to establish the opening energizing circuit upon a decrease of flow below a predetermined minimum point and to hold both circuits deenergized throughout the range of movement of said movable element between the positions corresponding to said minimum and maximum points.

10. In a fluid control system, a conduit for conducting a fluid from a point of high pressure to a point of low pressure, a regulating valve in said conduit, a motor for operating said regulating valve, an electric relay for controlling said motor, said relay having a neutral position in which said motor holds said regulating valve stationary, a closing position in which said motor actuates said regulating valve to reduce the widths of the opening thereof, and an opening position in which said motor actuates said regulating valve to widen the opening thereof, a flow gauge having a movable element for indicating the flow of liquid in said conduit, switching means operated by said movable element for establishing an opening energizing circuit for said relay and a closing energizing circuit for said relay whereby said relay is brought either to the opening position or to the closing position, said switching means being so arranged with respect to said movable element as to establish the closing energizing circuit upon an increase of flow above a predetermined maximum point and to establish the opening energizing circuit upon a decrease of flow below a predetermined minimum point and to hold both circuits de-energized throughout the range of movement of said movable element between the positions corresponding to said minimum and maximum points, and a main valve in said conduit for cutting off the circulation therein, said main valve having interlocking switching means arranged to interrupt the opening energizing circuit controlled by said movable element and to establish a second closing energizing circuit for said relay independent of the position of said movable element in response to closure of said main valve, and to interrupt said second closing energizing circuit and restore said opening energizing circuit in response to the opening of said main valve.

11. In a filtration plant, a plurality of flow lines, regulating valves associated with the individual lines, an electric relay associated with each of said regulating valves for controlling the opening thereof, a flow gauge associated with each of said lines having a movable element responsive to the condition of flow in said lines, switching means associated with said movable element and actuated by the movement thereof beyond predetermined maximum and minimum points for effecting energization of said relay to cause said regulating valve to close or open, respectively, a synchronous stepping motor associated with each of said movable elements for varying the range of the operative relationship between said elements and said switching means to control the magnitude of the flow in the associated line, and a synchronously operated mechanism associated with said stepping motor to remotely control the position thereof.

12. In a filtration plant, a plurality of filter beds, effluent lines leading from said beds, a main wash line along said beds, branch wash lines connecting said beds to said main wash line, wash line valves in each of said branch wash lines, a regulating valve in said main wash line, and a regulating mechanism for operating said regulating valve in response to the flow conditions in said main wash line, said regulating mechanism having a normal regulating range to produce closing and opening movement of said regulating valve in response to an increase and decrease of the flow in said line above and below predetermined values, respectively, and to produce further closing movement of said regulating valve in response to a decrease of the flow below a predetermined minimum value lower than the minimum value of the normal regulating range.

13. In a fluid distribution system, a main flow line, a plurality of branch lines extending from said main line, a closing valve in each branch line for cutting off the flow of fluid therein from said main line, a central regulating valve in said main flow line for maintaining a predetermined substantially constant flow in any of said branch lines upon opening of the closing valve thereof, said regulating valve having a regulating mechanism active over a predetermined range between a maximum and minimum value of the flow to cause opening of said valve in response to a decrease of the flow below said minimum value and to cause closing of said valve in response to an increase of such flow above a predetermined maximum value, and reset means associated with said mechanism for effecting the closure of said valve independently of said regulating action in response to a decrease of said flow below a predetermined value lower than the minimum value of said regulating range.

14. A flow control combination comprising a conduit, a regulating valve for the conduit, a piston-hydraulic cylinder combination adapted to position said valve, a pilot valve adapted to control operation of said combination, electrical relay means adapted to move said pilot valve, a differential pressure device responsive to variations of flow in said conduit and switching means adapted to be actuated by said differential device to control operation of said electrical relay means.

15. A flow regulator comprising, in combination, a conduit in which the flow of liquid is to be regulated, a valve for controlling flow through said conduit, an hydraulically operated piston operatively connected with said valve, a cylinder in which said piston operates, a pilot valve for controlling supply of hydraulic pressure medium to said cylinder, said pilot valve having positions for moving and a position for holding stationary said piston, a detector responsive to flow changes in the conduit, and relay mechanism operatively responsive to the detector to effect shifting of the pilot valve to said different positions selectively.

16. In a filtration plant including a filter bed, an effluent line leading from said filter bed, a main valve in said line for shutting off the flow from said filter bed, a regulating valve in said line for controlling the flow therein, means responsive to an increase or decrease of flow in said line for closing and widening, respectively, the opening in said regulating valve to maintain substantially uniform flow conditions in said line irrespective of the flow resistance of said bed, and means associated with the positioning of said main valve for cutting out or in the regulating action of said flow responsive means.

17. In a filtration apparatus, an effluent line connected to a filtration bed, an effluent valve in said line, a controller valve in said effluent line for controlling the rate of flow therethrough, means controlled by the rate of flow through said line for controlling the position of said controller valve, and means effective on the closing of said effluent valve to close said controller valve.

18. In a liquid treatment system of the class described, a conduit for conducting a liquid from a point of high pressure to a point of low pressure, a regulating valve in said conduit for controlling the magnitude of the flow therein, a member sensitive to the magnitude of the flow in said conduit, means associated with said last mentioned means for actuating said regulating valve to close and widen the opening thereof, a main valve in said conduit for interrupting the flow therein, and means actuated on the interruption of flow to produce closure of said regulating valve and for restoring the control action of said first named means in response to the commencement of flow.

19. In a flow control apparatus, a conduit, a differential pressure device upon said conduit, a pilot valve actuated by the variations in differential pressure, a piston, fluid connections between said pilot valve and the cylinder of said piston, a controlling valve upon the conduit actuated by said piston, and additional means for resetting said controlling valve at a desired position when the flow has reached a predetermined value.

20. In a flow control apparatus, a conduit, a flow measuring device on said conduit, means for maintaining a constant flow in said conduit comprising a regulating valve, and automatic means actuated from said flow measuring device to set this regulating valve in a predetermined initial position when the flow in the conduit has substantially ceased.

21. In a flow control apparatus, a conduit, means for maintaining a constant flow in said conduit comprising a differential pressure device and a valve upon said conduit actuated by means of the difference in pressure, and additional means for actuating said valve when the pressure differences set up by said differential pressure devices have fallen to a predetermined low value.

22. In a flow control apparatus, a conduit, a controlling valve upon said conduit, an associated regulating device actuating said controlling valve so as to maintain a constant normal flow through the line and another associated regulating device actuating said controlling valve so as to set it in a predetermined position when the flow through the line reaches an abnormal value.

23. In a flow control system, a conduit, means adapted to close said conduit, regulating means for maintaining a constant flow in said conduit actuated from the flow in said conduit, means for cutting out said regulating means actuated upon substantial stoppage of flow in said conduit, and means for again cutting in said regulating means actuated upon the restarting of the flow in said conduit.

24. In a flow control apparatus, a conduit, means for maintaining a constant flow in said conduit comprising a variable resistance device in the line, and additional automatically actuated means to set this resistance device at a value permitting only a diminished flow when the flow in the line has reached a predetermined abnormally low value actuated by a differential pressure device operatively connected to said conduit.

25. In a reset flow proportioning device, a main conduit, a series of branch conduits, valves upon all of said branch conduits, a flow regulating device upon the main conduit and means upon the main conduit to prevent more than a predetermined initial flow actuated upon the closure of all of said valves by a flow measuring device operatively connected to said conduit.

In testimony whereof I have hereunto subscribed my name.

SAMUEL L. ADELSON.